United States Patent [19]

Tajima

[11] Patent Number: 5,036,238
[45] Date of Patent: Jul. 30, 1991

[54] ROTOR OF SALIENT-POLE TYPE ROTARY MACHINE

[75] Inventor: Masaaki Tajima, Nagasaki, Japan

[73] Assignee: Mitsubishi Denki Kabushiki Kaisha, Tokyo, Japan

[21] Appl. No.: 551,126

[22] Filed: Jul. 11, 1990

[30] Foreign Application Priority Data

Jul. 19, 1989 [JP] Japan .................. 1-84811

[51] Int. Cl.$^5$ .............................. H02K 9/00
[52] U.S. Cl. .................. 310/214; 310/269; 310/194; 267/169
[58] Field of Search ........... 310/269, 214, 194; 267/169, 141.1, 153, 291

[56] References Cited

U.S. PATENT DOCUMENTS

| | | | |
|---|---|---|---|
| 2,099,807 | 11/1937 | Gregory | 261/291 |
| 2,155,521 | 4/1939 | Zavarella | 267/291 |
| 2,650,088 | 8/1953 | Formanek | 267/291 |
| 2,664,577 | 1/1954 | Sanborn | 267/291 |
| 2,743,102 | 4/1956 | Seddon | 267/293 |
| 2,908,341 | 10/1959 | Nallinger | 267/293 |
| 3,503,601 | 3/1970 | Wells | 267/169 |
| 3,830,517 | 8/1974 | McNeil | 267/169 |
| 4,268,773 | 5/1981 | Beck et al. | 310/269 |
| 4,286,777 | 9/1981 | Brown | 267/141.1 |
| 4,467,229 | 8/1984 | Ogita | 310/269 |
| 4,496,863 | 1/1985 | Sawatani | 310/269 |
| 4,566,678 | 1/1986 | Anderson | 267/141.1 |
| 4,571,215 | 2/1986 | Hansen | 267/141.1 |
| 4,809,960 | 3/1989 | Kakimoto et al. | 267/293 |

FOREIGN PATENT DOCUMENTS

| | | |
|---|---|---|
| 57-8355 | 2/1982 | Japan . |
| 57-111053 | 7/1982 | Japan . |
| 57-175559 | 11/1982 | Japan . |
| 61-22166 | 2/1986 | Japan . |

*Primary Examiner*—Steven L. Stephan
*Assistant Examiner*—Matt Nguyen
*Attorney, Agent, or Firm*—Burns, Doane, Swecker & Mathis

[57] ABSTRACT

A rotor of a salient-pole type rotary machine is disclosed in which field coils are held by a coil brace disposed between adjacent magnetic poles. In addition to the coil brace, a holder provided with an elastic member is also disposed between the magnetic poles, and another elastic member is disposed between the coil brace and the said holder, whereby the said two elastic members are utilized for the fixing of the field coils and for the pressing force of the coil brace. And the whole of the coil holding mechanism is separated from a spider. This construction permits the field coils to be held in place without any great change in the holding force under any dimensional change.

8 Claims, 2 Drawing Sheets

ROTOR OF SALIENT-POLE TYPE ROTARY MACHINE

BACKGROUND OF THE INVENTION

1. Field of the Invention

The present invention relates to a rotor of a salient-pole type rotary machine in which a coil brace is disposed between adjacent magnetic poles to hold field coils.

2. Description of the Prior Art

FIG. 1 shows a partial sectional view of a conventional rotor of a salient-pole type rotary machine which is disclosed, for example, in Japanese Utility Model Publication No. 8355/82. In the same figure, numeral 1 designates a magnetic pole; 2, a pole insulator applied to the magnetic pole 1; 3, a field coil; 4, a spacer; 5, a coil brace for pressing the field coil 3; 6, a bolt for fixing the coil brace 5; 7, a coil brace insulator for isolating the field coil 3 and the coil brace 5 from each other; and 8, a spider for holding the magnetic pole 1.

The operation of such conventional rotary machine will now be described. When the bolt 6 is tightened, the coil brace 5 presses and fixes field coils 3 to magnetic poles 1 through coil brace insulators 7. Further, by means of spacers 4 the field coils 3 are pushed and fixed to the shoulders of the magnetic poles 1.

The conventional rotor of a salient-pole type rotary machine is constructed as above, so at the time of fabrication of the rotor it is necessary to make adjustment and machining of the abutment surfaces of coil brace and coil brace insulator and that of the abutment surfaces of spacer and spider, field coil. Besides, for the correction of dimensional changes caused by secular ageing of the insulating material it is necessary to disassemble the machine, pull out the rotor, then make additional tightening of bolts and re-adjustment of spacers. Further, when field coils expand thermally due to rise of the temperature during operation of the machine, the coil brace presses the field coils, thus causing deformation of the coils.

SUMMARY OF THE INVENTION

The present invention has been accomplished for eliminating the above-mentioned problems. It is an object of the invention to provide a rotor of a salientpole type rotary machine capable of being manufactured inexpensively without the necessity of making adjustment and machining of the abutment surfaces of coil brace and coil brace insulator and that of the abutment surfaces of spacer and spider, field coil.

It is another object of the present invention to provide a rotor of a salient-pole type rotary machine having a correcting function for secular dimensional changes and not requiring additional tightening of bolts or re-adjustment of spacer after disassembling of the machine and pulling out of the rotor.

It is a further object of the present invention to provide a rotor of a salient-pole type rotary machine having an absorbing function for dimensional changes caused by thermal expansion of field coils due to rise of the temperature during operation of the machine to thereby prevent coil brace from pressing and deforming field coils.

It is a still further object of the present invention to provide a rotor of a salient-pole type rotary machine in which field coils are held by an improved coil brace far superior in accuracy and performance to conventional means and capable of being realized relatively inexpensively.

According to the present invention, in order to achieve the above-mentioned objects, there is provided a rotor of a salient-pole type rotary machine, in which not only a coil brace but also a holder provided with an elastic member is disposed between adjacent magnetic poles, and also between the coil brace and the holder there is disposed another elastic member, thereby utilizing the said two elastic members for the fixing of field coils and for the pressing force of the coil brace, and the whole of the coil holding mechanism is separated from a spider.

Thus, the field coil fixing mechanism and coil brace used in the present invention utilize the restoring forces of the elastic members and thereby hold field coils without causing any great change in the holding forces thereof even against any type of a dimensional change.

The above and further objects and novel features of the present invention will more fully appear from the following detailed description when the same is read in connection with the accompanying drawings. It is to be understood, however, that the drawings are for purpose of illustration only and is not intended to limit the scope of the invention.

DETAILED DESCRIPTION OF THE PREFERRED EMBODIMENT

A preferred embodiment of the present invention will now be described in detail hereinunder with reference to the accompanying drawings.

Figure 1:
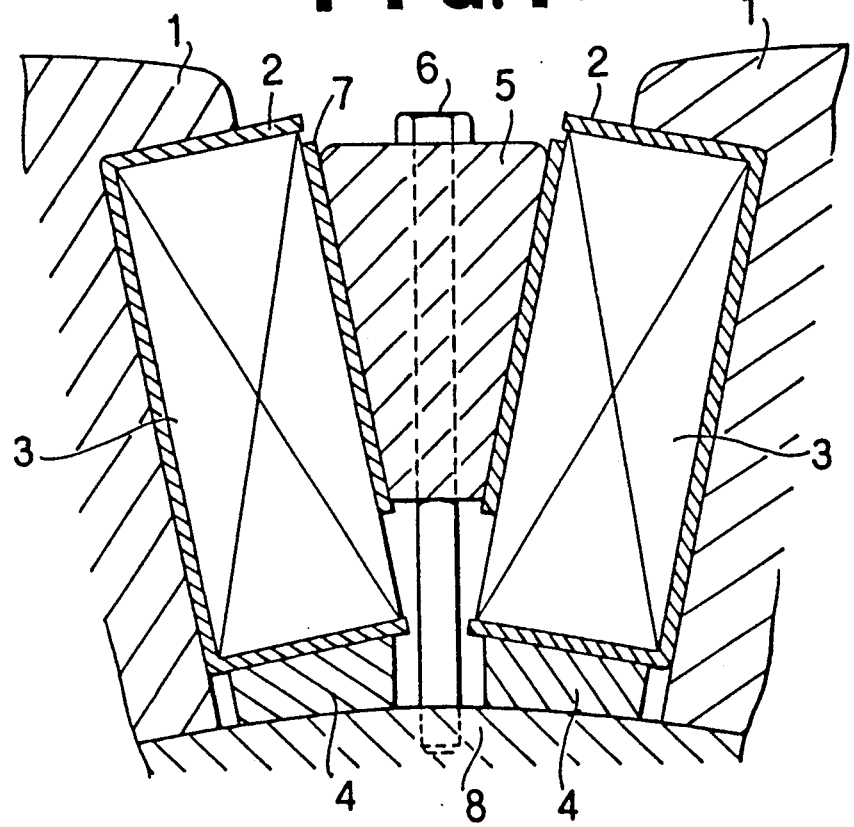
FIG. 1 is a sectional view showing a principal portion of a conventional rotor of a salient-pole type rotary machine.
Figure 2:
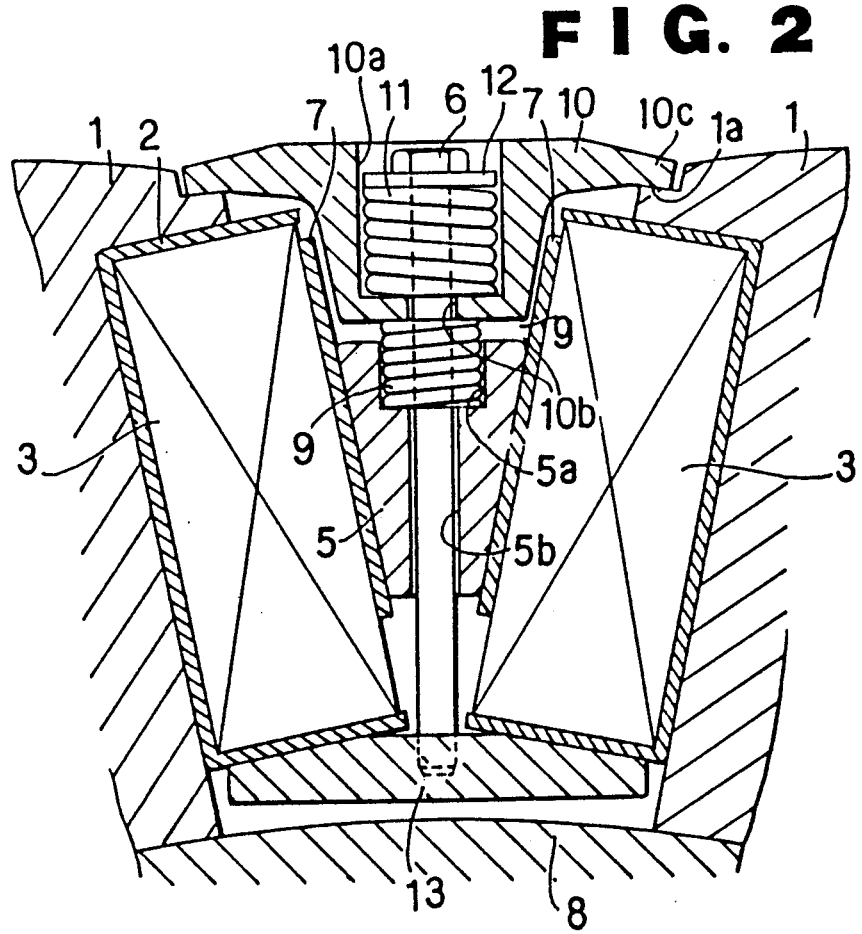
FIG. 2 is a sectional view showing a principal portion of a rotor of a salient-pole type rotary machine according to an embodiment of the present invention.

In FIG. 2, numeral 1 designates a magnetic pole having a stepped portion 1a; 2, a pole insulator applied to the magnetic pole 1; 3, a field coil; 6, a bolt; 7, a coil brace insulator; 5, a wedge-shaped coil brace inserted between adjacent magnetic poles. The coil brace 5 has a recess 5a formed in the upper surface thereof to insert a first spring 9 therein and is centrally formed with a hole 5b for insertion of the bolt 6 therethrough. Numeral 10 designates a spring holder disposed above the coil brace 5 through gap g. The spring holder 10, which is formed of a non-magnetic material, has a recess 10a formed in the upper surface thereof to insert a second spring 11 therein and also has a hole 10b formed centrally in the lower portion thereof for insertion of the bolt 6 therethrough. The spring holder 10 further has a flange portion 10c formed at the peripheral edge thereof. The flange portion 10c engages the stepped portion 1a of the magnetic pole 1 and is thereby supported. The first spring 9 is mounted between the bottom of the recess of the coil brace 5 and the bottom of the holder 10, while the second spring 11 is mounted between a spring presser fitted on the bolt 6, 12 and the bottom of the recess 10a of the spring holder 10. Numeral 13 designates a coil supporting plate disposed in abutment with the undersides of the field coils 3 to support the coils. The coil supporting plate 13 is threadedly connected to the front end of the bolt 6. Numeral 8 designates a spider which holds the magnetic poles 1 and forms a magnetic path.

Figure 3:
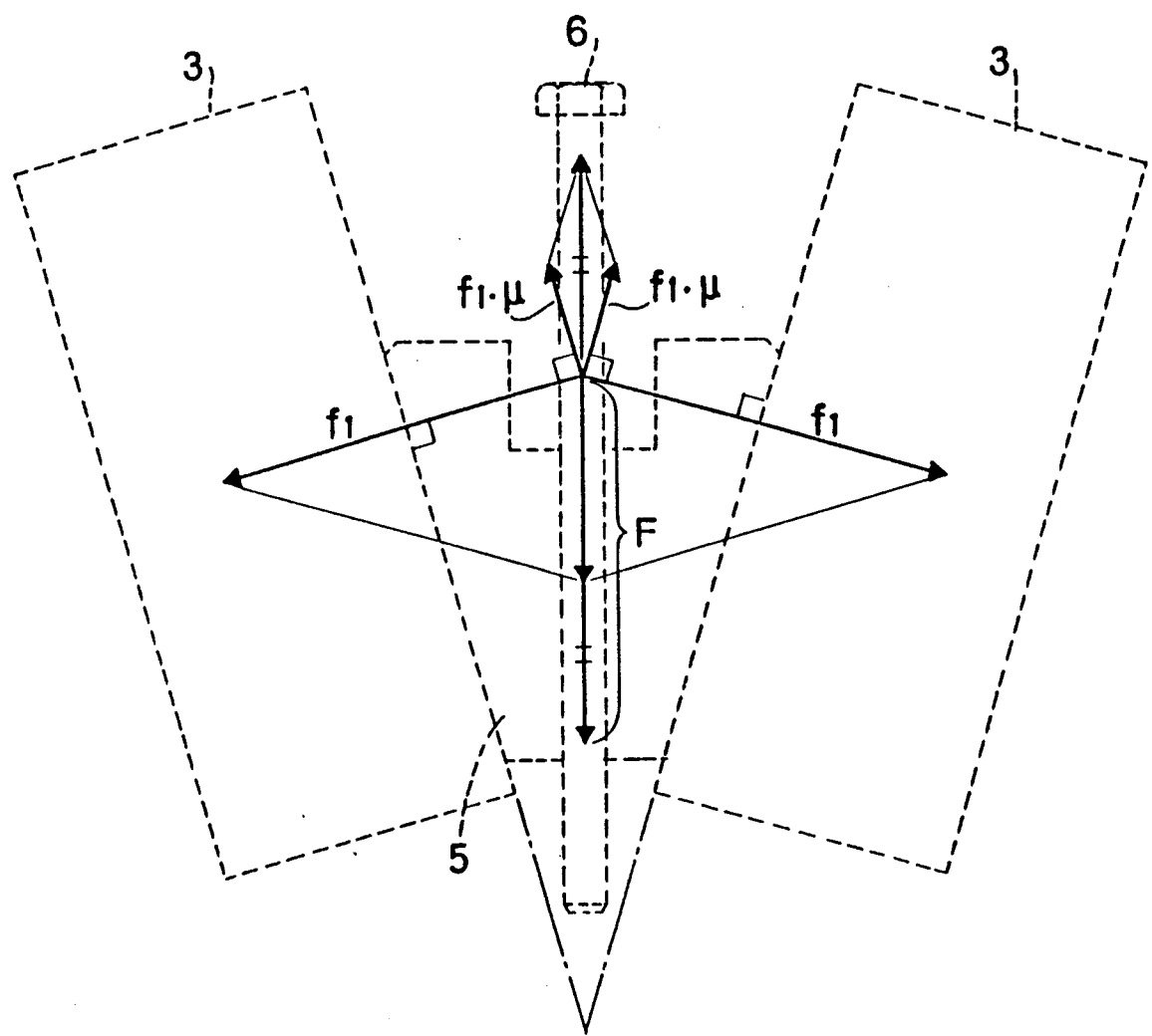
FIG. 3 is a vector diagram showing a relation of forces observed when field coils are held by a coil brace.

FIG. 3 shows a vector diagram of a relation of forces observed when magnetic coils are held by the coil brace. In the same figure, reference mark F represents a pressing force induced by tightening of the bolt 6; $f_1$ a coil pressing force of each pressing surface of the coil brace 5 against the associated field coil 3 in a direction perpendicular to the said pressing surface; and $\mu$ a slant friction coefficient. Thus, $f_1 \cdot \mu$ in the figure indicates a frictional force in the slant direction against the pressing force F, but the value thereof is actually negligible because it is very small as compared with the value of F. It is sufficient for the coil pressing force $f_1$ to be not smaller than a component of force in the coil brace pressing surface direction (opposite to $f_1$) of a centrifugal force acting on the field coil 3 upon rotation of the rotor. But when an angular acceleration of rotation changes as in the case of a rotary machine for driving a loading machine on which is exerted an impact torque, the coil pressing force $f_1$ must be of a value not smaller than the above component of force plus a tangential force induced in the field foil 3 by the above angular acceleration.

The following description is now provided about the spring constant of the second spring 11 mounted between the spring holder 10 and the head of the bolt 6. In the embodiment illustrated in FIG. 2, the spring constant of the second spring 11 is determined so as to satisfy the following three conditions simultaneously.

(i) A spring force sufficient to support the weight of field coils 3 should be provided.
(ii) A force larger than the centrifugal force exerted on the spring holder 10 should be provided.
(iii) A force larger than the spring force of the first spring 9 should be provided.

That is, the sum of the above three forces should be attained. Further, when the rotor is mounted, the amount of the bolt 6 to be threaded in is adjusted so that the above forces (i) to (iii) continues to act even in the event of contraction of the entire size after secular ageing of the insulating material for the coils.

Now, the spring constant of the first spring 9 mounted between the recess 5a formed in the upper surface of the coil brace 5 and the bottom outer surface of the spring holder 10 will be described. As to the spring constant of the first spring 9, it is sufficient if there is obtained a force not smaller than a resultant force of the foregoing coil pressing forces $f_1$, $f_1$ plus the centrifugal force exerted on the coil brace 5. Also in this case, at the time of mounting of the coil brace, the bolt 6 is threaded in so that the said force continues to act even in the event of contraction of the size after secular ageing of the insulation material for the coils. Actually, the spring constant of the first spring 9 is smaller than that of the second spring 11, and since it is a single bolt that extends through both springs, it is possible to cope with such ageing of the coil insulation by adjusting once the amount of the bolt to be threaded in.

Next, operation of the rotor constructed as above will now be described. Field coils 3 are pressed against the stepped portions 1a of the magnetic poles 1 by the restoring force of the compressed second spring 11 transmitted to the coils through the bolt 6 and the coil supporting plate 13, and are held thereby. On the other hand, on the coil brace 5 is exerted the restoring force of the compressed first spring 9, and the field coils 3 are pushed against the magnetic poles 1 by virtue of a wedging effect of the coil brace 5, and are held thereby.

Such effects of the springs eliminate the need of adjusting and machining the abutment surfaces of the coil brace in the manufacture of the rotor, and since the holding force can be kept approximately constant even in the event of a dimensional change caused by secular ageing of the insulating material or thermal expansion of the coils and the restraint force for the field coils can be controlled, it is possible to prevent the deformation of the coils.

In the above embodiment it is assumed that coil springs are used as the elastic members. As the first spring to cope with secular ageing of the insulating material or a dimensional change caused by thermal expansion of the field springs there is used a coil spring which permits a relatively large amount of expansion and contraction. On the other hand, as the second spring which does not require so large amount of expansion and contraction but requires a predetermined stable spring constant there may be used a coned disc spring or rubber other than the coil spring, and also in this case there will be attained a satisfactory effect.

According to the present invention, as set forth above, since two elastic members are used in the field coil holding mechanism, it is no longer necessary to adjust the abutment surfaces of the coil brace in the manufacture of the rotor, so the machining cost is reduced. Moreover, since secular dimensional changes during operation of the machine are absorbed, it is not required to make additional tightening of the fixing bolt. Further, maintenance is easy because thermal expansion due to rise of the temperature during operation of the machine is absorbed to prevent the deformation of the field coils. Additionally, since the loosening of the bolt can be prevented by the elastic members, there is obtained a highly reliable rotor.

What is claimed is:

1. A rotor of a salient-pole type rotary machine comprising:
   a coil brace disposed between adjacent magnetic poles through a coil brace insulator to hold field coils;
   a holder engaged and supported by said magnetic poles in a position above said coil brace;
   a coil supporting plate disposed under said field coils, said coil supporting plate being in abutment with the field coils to press and thereby support the coils between it and coil receiving portions of said magnetic poles;
   a mounting bolt extending through both said holder and said coil brace and engaged threadedly with said coil supporting plate;
   a first elastic member interposed between a lower surface of said holder and an upper surface of said coil brace; and
   a second elastic member interposed between a lower end of a head portion of said mounting bolt, said head portion being larger in diameter than the other portion of the mounting bolt, and an upper surface of said holder.

2. A rotor according to claim 1, wherein said holder is formed of a non-magnetic material.

3. A rotor according to claim 2, wherein said non-magnetic material is an aluminum alloy.

4. A rotor according to claim 1, wherein said first elastic member is a coil spring.

5. A rotor according to claim 1 or claim 4, wherein said second elastic member is constituted by a synthetic rubber.

6. A rotor according to claim 1 or claim 4, wherein said second elastic member is a coned disc spring.

7. A rotor according to claim 1, wherein said first elastic member is constituted by a synthetic rubber.

8. A rotor according to claim 1, wherein said first elastic member is a coned disc spring.

* * * * *